United States Patent [19]
Dunsmore et al.

[11] Patent Number: 4,777,507
[45] Date of Patent: Oct. 11, 1988

[54] CONTROL SYSTEM FOR AN ELECTRONIC FLASH UNIT

[75] Inventors: Clay A. Dunsmore, Hilton; Richard W. Lourette, Rochester, both of N.Y.

[73] Assignee: Eastman Kodak Company, Rochester, N.Y.

[21] Appl. No.: 145,992

[22] Filed: Jan. 20, 1988

[51] Int. Cl.⁴ ............................................. G03B 15/05
[52] U.S. Cl. .................................. 354/418; 354/127.12
[58] Field of Search ................ 354/418, 127.1, 127.11, 354/127.12

[56] References Cited

U.S. PATENT DOCUMENTS

| | | | |
|---|---|---|---|
| 2,856,562 | 10/1958 | Grimm | 315/135 |
| 4,239,361 | 12/1980 | Harvey | 354/145 |
| 4,258,991 | 3/1981 | Kuraishi | 354/32 |
| 4,259,615 | 3/1981 | Kashihara et al. | 315/241 P |
| 4,464,039 | 8/1984 | Ishida | 354/418 |
| 4,472,041 | 9/1984 | Carcia et al. | 354/413 |
| 4,501,481 | 2/1985 | Kataoka et al. | 354/413 |
| 4,540,265 | 9/1985 | Harvey | 354/417 |
| 4,544,254 | 10/1985 | Egawa et al. | 354/403 |

Primary Examiner—W. B. Perkey
Attorney, Agent, or Firm—Roger A. Fields

[57] ABSTRACT

A flash charge related signal which indicates that there is inadequate flash energy to fire an electronic flash device is provided during flash-charging, until the elapse of a predetermined fraction of the last-measured full charge time for the flash device. The predetermined fraction determines a lesser charge time sufficient to ensure adequate (not full) flash energy for the next flash firing. Thus, the charging time perceived by the photographer always appears shortened to the lesser time, even though the flash device is not fired until it is fully charged. Moreover, the waiting time to fire the flash device can be shortened by relying on the lesser time.

6 Claims, 5 Drawing Sheets

CONTROL SYSTEM FOR AN ELECTRONIC FLASH UNIT

BACKGROUND OF THE INVENTION

1. Field of the Invention

The invention relates generally to the field of photography, and particularly to an electronic flash control system for a camera. More specifically, the invention relates to an energy-saving flash control system which signals the readiness of the flash device for the next flash exposure.

2. Description of the Prior Art

Many commercially available electronic flash units monitor the voltage level of a flash-firing capacitor and, via a ready lamp, or by enabling a shutter release mechanism in an associated camera, inform a camera operator when there is sufficient firing voltage for a flash exposure. In some electronic flash units, the firing voltage is considered to be sufficient when the flash-firing capacitor is charged above a predetermined voltage level that corresponds to the minimum voltage required to ignite the flash tube. In other electronic flash units, the firing voltage is considered to be sufficient when the flash firing capacitor is charged above a predetermined voltage threshold that is a given percentage of the maximum operating voltage of the flash unit. Typically, the threshold voltage produces flash illumination that results in an under-exposure of about one-half to two-thirds of a stop from the flash illumination that is produced when the capacitor is fully charged.

A noteworthy electronic flash device is disclosed in commonly assigned U.S. Pat. No. 4,540,265, granted Sept. 10, 1985. The flash device enables flash exposures to be made at a rapid rate, assuming that scene conditions, such as subject range, reflectivity and ambient illuminance, do not change. When the flash energy retained by a flash-firing capacitor at the termination of the preceding flash exposure exceeds the flash energy consumed for that exposure, an energy-monitoring circuit causes a status indicator to visibly signal that the flash unit is ready for the next flash exposure.

Another noteworthy electronic flash device is disclosed in U.S. Pat. No. 4,464,039, granted Aug. 7, 1984. The flash device provides an electronic signal which corresponds to the required amount of flash light necessary to meet the flash exposure conditions, e.g. film sensitivity, aperture value, subject distance, etc. When the charge level of the flash-firing capacitor reaches a given level matching the particular level of the electronic signal, flash firing for the next flash exposure is enabled.

Although many of the known prior art control systems, such as disclosed in U.S. Pat. Nos. 4,540,265 and 4,464,039, can save energy and can shorten the waiting time to fire the electronic flash device, by relying on a lesser charge than the full charge, they are relatively complex in construction. As a result, it is difficult to employ them in a low cost camera.

A third electronic flash device which is not energy-saving, but nevertheless is relevant, is disclosed in U.S. Pat. No. 4,472,041, granted Sept. 18, 1984. Control means enables the flash device to operate in a charge mode for a fixed or constant time (always 1 sec.) immediately subsequent to termination of the exposure interval, but before a film transport motor is energized. After the elapse of the fixed time, the flash device is disabled from operating in its charge mode and the film transport motor is energized. Thus, a "sneak charge" is provided during the fixed time in order to reduce the apparent charge time subsequent to transport of the exposed film, even though the overall charge time remains unchanged. Since the photographer only perceives the flash charge time subsequent to film transport, the sense provided is one of a substantially shortened charge time for the flash device.

SUMMARY OF THE INVENTION

The invention improves the perceived performance of the charging means for an electronic flash device without degrading the flash picture quality.

According to the invention, a timer is adapted to measure the charging time necessary to fully charge an electronic flash device from a substantially discharged condition and to measure a lesser time equal to a predetermined fraction of the last-measured full-charge time sufficient to adequately (not fully) charge the flash device for the next flash exposure. Preferably, the predetermined fraction results in an under-exposure of about one-half of a stop from the flash illumination that is produced when the flash device is fully charged. A non-volatile memory for storing the last-measured full charge time is updated only when a new full charge time is measured. If the flash device is fired after the lesser time has elapsed, but before the flash device is fully charged, the memory is not updated. A status indicator visibly signals whether or not the lesser time has elapsed. Thus, the charging time perceived by the photographer always appears shortened to the lesser time, even though the flash device is not fired until it is fully charged. Moreover, the waiting time to fire the flash device can be shortened by relying on the lesser time.

DETAILED DESCRIPTION OF THE PREFERRED EMBODIMENT

The invention is disclosed as being embodied preferably in a conventional 35 mm camera having a built-in electronic flash unit. Because such a camera is well known, this description is directed in particular to photographic elements forming part of or cooperating directly with the disclosed embodiment. It is to be understood, however, that other elements not specifically shown or described may take various forms known to persons or ordinary skill in the art.

Figure 1:
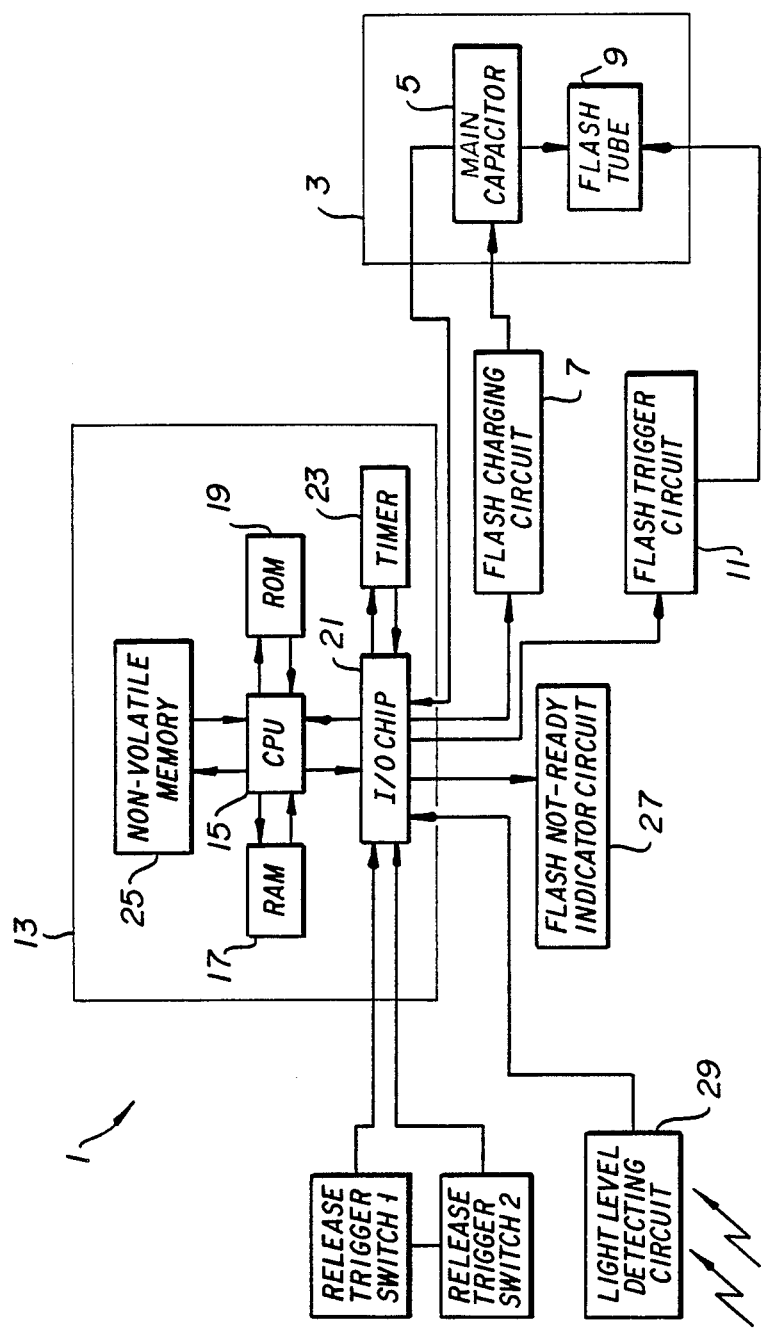
FIG. 1 is a block diagram of a control system for an electronic flash device according to a preferred embodiment of the invention.

Referring now to the drawings, FIG. 1 is a block diagram of a control system 1 for controlling the charging and the firing of an electronic flash device 3 in a 35 mm camera. The flash device 3 is a known type including a main or flash-firing capacitor 5 which may be charged by a conventional charging circuit 7 to slightly above a predetermined voltage level, e.g. 350 volts, corresponding to a substantially fully charged condition for presenting the maximum amount of flash light. The charging circuit 7 includes a voltage converter, not shown, which converts a DC voltage derived from a power supply, such as a 6 or 9 volt battery, to the flash voltage necessary to fully charge the main capacitor 5. A flash tube 9 of the flash device 3 is connected in parallel with the main capacitor 5 and may be ignited by a conventional triggering circuit 11, set in operation by the closing of conventional synchronous contacts of an exposure control device, not shown, in the usual manner, such as disclosed in U.S. Pat. No. 4,472,041.

As shown in FIG. 1, a conventional microcomputer 13 comprises a microprocessor or central processing unit (CPU) 15, a random access memory (RAM) 17, a read-only memory (ROM) 19, an input/output (I/O) chip 21, a timer 23, and a separate non-volatile memory 25. The timer 23 is adapted to measure the particular full charge time $T_F$ necessary to fully charge the main capacitor 5 from a substantially discharged condition, such as after the flash tube 9 is fired to provide the maximum amount of flash light, and to measure a lesser charge time $T_L$ equal to a predetermined fraction of the last-measured full charge time sufficient to adequately (not fully) charge the main capacitor for the next flash exposure. Preferably, the predetermined fraction is ⅔ of the last-measured full charge time $T_F$, which results in an under-exposure of about one-half of a stop from the flash illumination that is produced when the main capacitor 5 is fully charged. The non-volatile memory 25 stores the last-measured full charge time $T_F$, and is updated only when a new full charge time $T_F'$ is measured. If the flash tube 9 is ignited after the lesser charge time $T_L$ has elapsed, but before the main capacitor 5 is fully charged, the non-volatile memory 25 is not updated.

When alkaline batteries are used as the power supply for the electronic flash device 3, the full charge time $T_F$, and hence the lesser charge time $T_L$, measured by the timer 21, necessarily becomes longer in duration as the battery strength diminishes. Thus, after a number of flash exposures the last-measured full charge time $T_F$ will be of longer duration as compared to the first-measured full charge time when the batteries are at their freshest.

A conventional flash not-ready indicator circuit 27, shown in FIG. 1, includes a light emitting diode (LED), not shown, on the body of the camera, which is energized to visibly indicate that the lesser charge time $T_L$ measured by the timer 23 has not elapsed. Operation of the camera is effected via a pair of normally open switches SW. 1 and SW. 2. The two switches SW. 1 and SW. 2 are associated with a shutter release button, not shown, on the body of the camera, for respective closing in response to initial (half-way) and completed (full-way) manual depression of the shutter release button.

To determine that flash use is necessary, such as when the ambient light is too low for a proper daylight exposure, there is provided a conventional light level detecting circuit 29. The detecting circuit 29 monitors the level of ambient light to determine whether or not it is appropriate to fire the flash tube 9. When the level of ambient light is less than or equal to a predetermined light level, e.g. 64 foot-lamberts, the flash tube 9 is automatically fired during the exposure interval.

Figure 2A:
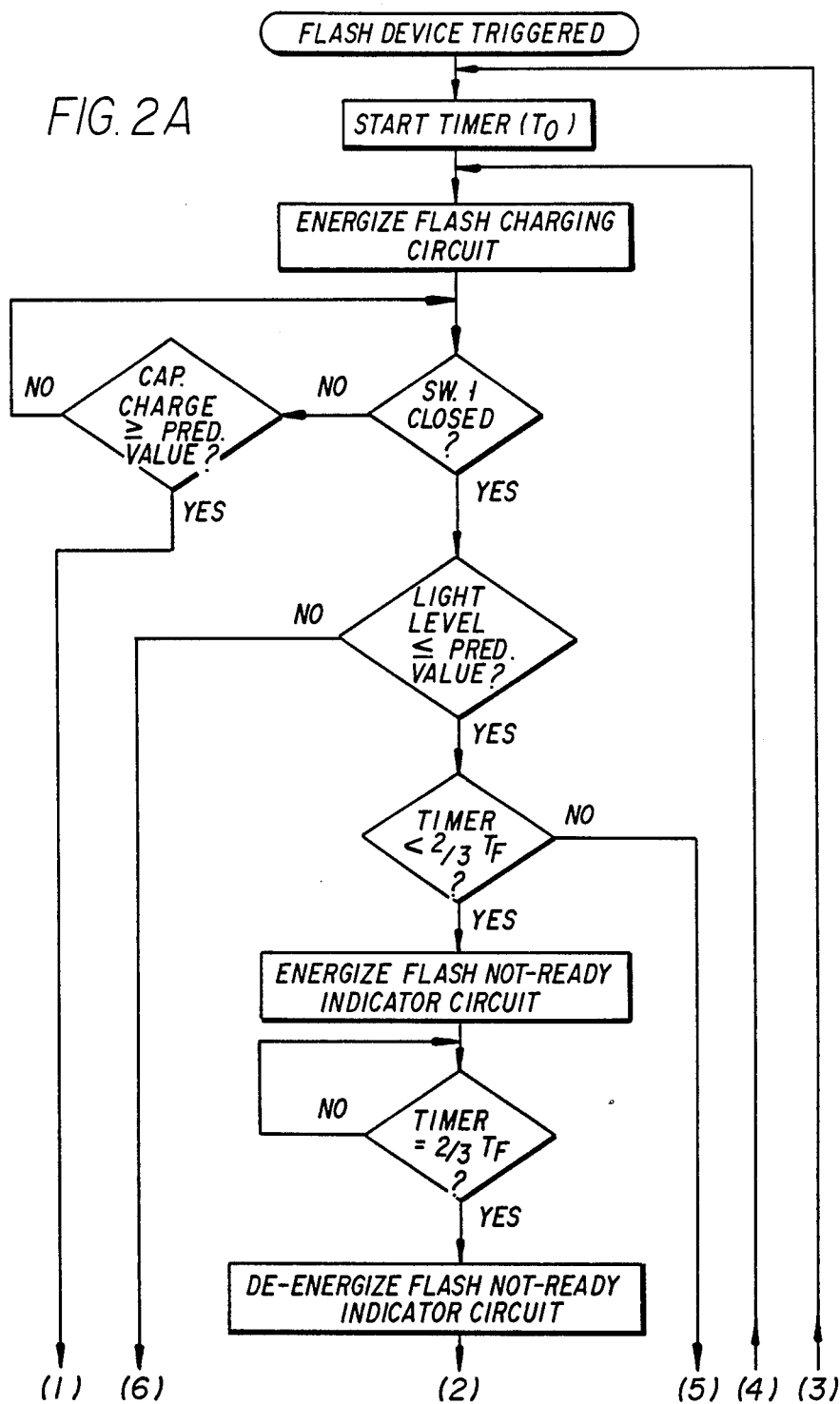
FIGS. 2A and 2B are a microcomputer flow chart depicting the various steps of operation of the control system immediately after the flash device has been fired.
Figure 2B:
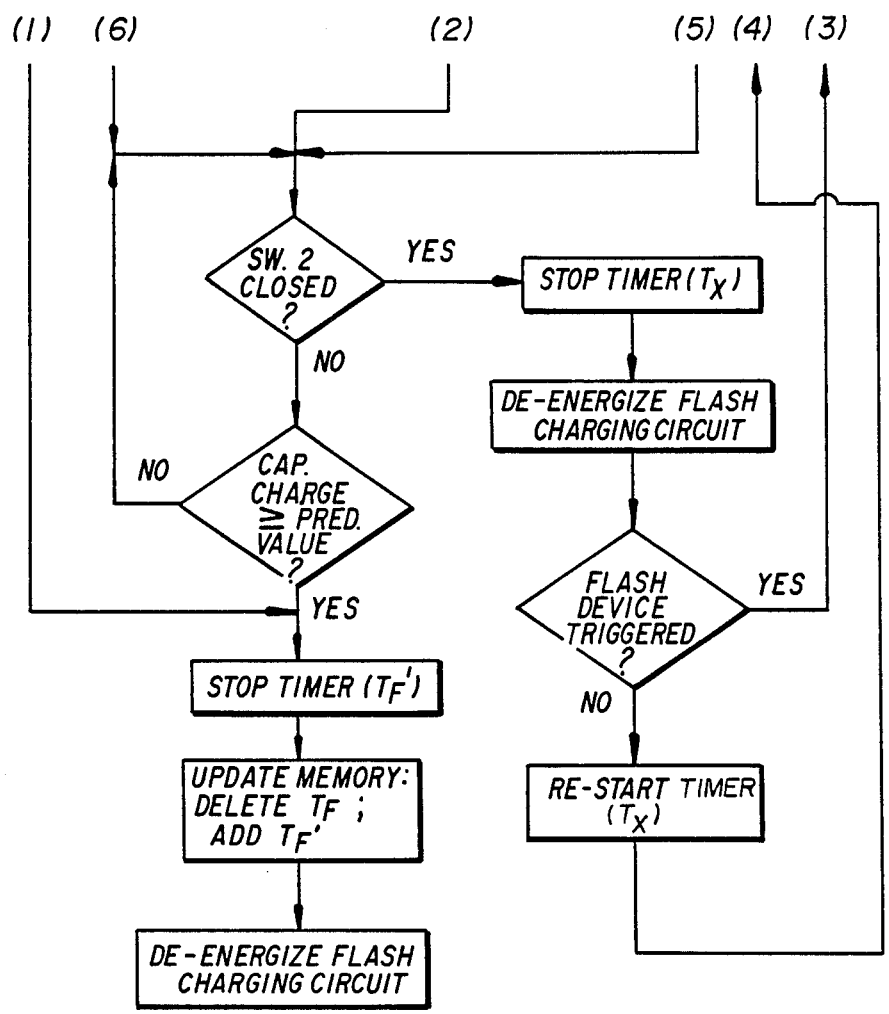

FIGS. 2A and 2B are a flow chart for the microcomputer 13 depicting the various steps of operation of the control system 1 immediately after the flash tube 9 is fired and the main capacitor 5 is substantially drained of any charge. The various steps are as follows:

1. If as shown in the flow chart of FIGS. 2A and 2B the flash tube 9 has just been fired, causing the main capacitor 5 to be depleted to a substantially discharged condition, the timer 23 is started at $T_O$ and the flash charging circuit 7 is energized to begin re-charging the main capacitor.

2. The CPU 15 then interrogates the switch SW. 1 to determine whether the switch has been closed by initial (half-way) manual depression of the shutter release button.

3. When the switch SW. 1 is not closed before the voltage level of the main capacitor 5 reaches a predetermined value, e.g. 350 volts, corresponding to a substantially fully charged condition for presenting the maximum amount of flash light, the timer 23 is stopped at the measured full charge time $T_F'$ and the flash charging circuit 7 is de-energized to discontinue re-charging the main capacitor 5. Concurrently, the full charge time $T_F'$ just measured by the timer 23 replaces the previously measured full charge time $T_F$ stored in the non-volatile memory 25.

4. Going back to step 3, when the switch SW. 1 is closed before the voltage level of the main capacitor 5 reaches the predetermined value corresponding to a substantially fully charged condition, and in addition the level of ambient light determined by the light level detecting circuit 29 is too low for a proper daylight exposure, i.e. is less than or equal to a predetermined light level, e.g. 64 foot-lamberts, the CPU 15 interrogates the timer 23 to determine whether the charge time actually measured by the timer is less than ⅔ of the last-measured full charge time $T_F$ stored in the non-volatile memory 25. If the answer is "YES", i.e. the actual measured charge time is less than ⅔ of the last-measured charge time $T_F$, the flash not-ready indicator circuit 27 is energized to visibly indicate that the lesser charge time $T_L$ has not elapsed.

5. Then the CPU 15 interrogates the timer 23 to determine whether the charge time actually measured by the timer has reached ⅔ of the last-measured full charge time $T_F$ stored in the non-volatile memory 25. If the answer is "YES", the flash not-ready indicator circuit 27 is de-energized to visibly indicate that the lesser charge time $T_L$ has elapsed. At this time, the main capacitor 5 is adequately (not fully) charged for the next flash exposure. That is, it is sufficiently charged to result in an under-exposure of about one-half of a stop from the flash illumination that is produced when the main capacitor 5 is fully charged.

6. The CPU 15 then interrogates the switch SW. 2 to determine whether the switch has been closed by completed (full-way) manual depression of the shutter release button.

7. When the switch SW. 2 is not closed before the voltage level of the main capacitor 5 reaches the predetermined value corresponding to a substantially fully charged condition, the timer 23 is stopped at the measured full charge time $T_F'$, and the flash charging circuit 7 is de-energized to discontinue re-charging the main capacitor 5. Concurrently, the full charge time $T_F'$ measured by the timer 23 replaces the previously measured full charge time $T_F$ stored in the non-volatile memory 25.

8. Going back to step 7, when the switch SW. 2 is closed before the voltage level of the main capacitor 5 reaches the predetermined value corresponding to a substantially fully charged condition, the timer 23 is stopped at some measured charge time $T_X$ which most likely is greater than ⅔ of the last-measured full charge time $T_F$ stored in the non-volatile memory 25, but is less than the stored full charge time, and the flash charging circuit 7 is de-energized. At this time, the main capacitor 5 is adequately (not fully) charged for the next flash exposure.

9. Then the CPU 13 interrogates the flash triggering circuit 11 to determine whether or not the flash tube 9 has been ignited to take a flash exposure. If the answer is "YES", the last-measured full charge time $T_F$ stored in the non-volatile memory 25 is not updated and the cycle is repeated beginning at Step 1. If the answer is "NO", for example because of a change in lighting conditions, the timer 23 is re-started at the measured charge time $T_X$ and the cycle is repeated beginning with re-energization of the flash charging circuit 7 to continue re-charging the main capacitor 5.

10. Then Step 2 is repeated.

11. Then Step 3 is repeated.

12. Then Step 4 is repeated, with the exception that the answer is "NO" to the interrogation of the timer 23 by the CPU 15, i.e. the charge time actually measured by the timer is greater than ⅔ of the last-measured full charge time $T_F$ stored in the non-volatile memory 25. Consequently, the flash not-ready indicator circuit 27 is not energized and the cycle skips Step 5, instead jumping ahead to Steps 6, 7, etc.

13. Going back to Step 4, when the switch SW. 1 is closed before the voltage level of the main capacitor 5 reaches the predetermined value corresponding to a substantially fully charged condition, but the level of ambient light determined by the light level detecting circuit 29 is high enough for a proper daylight exposure, the cycle skips Step 5, instead jumping ahead to Steps 6 and 7.

Figure 3A:
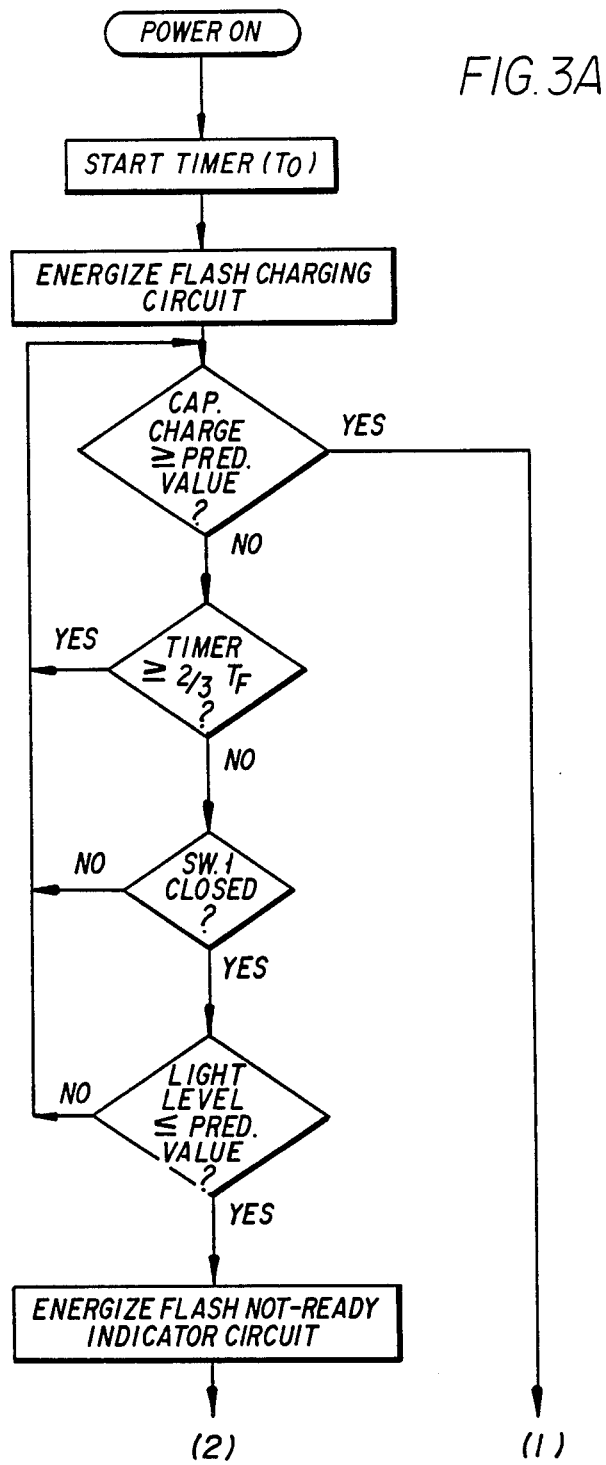
FIGS. 3A and 3B are a microcomputer flow chart depicting the various steps of operation of the control system when the power is turned on following a period of non-use.
Figure 3B:
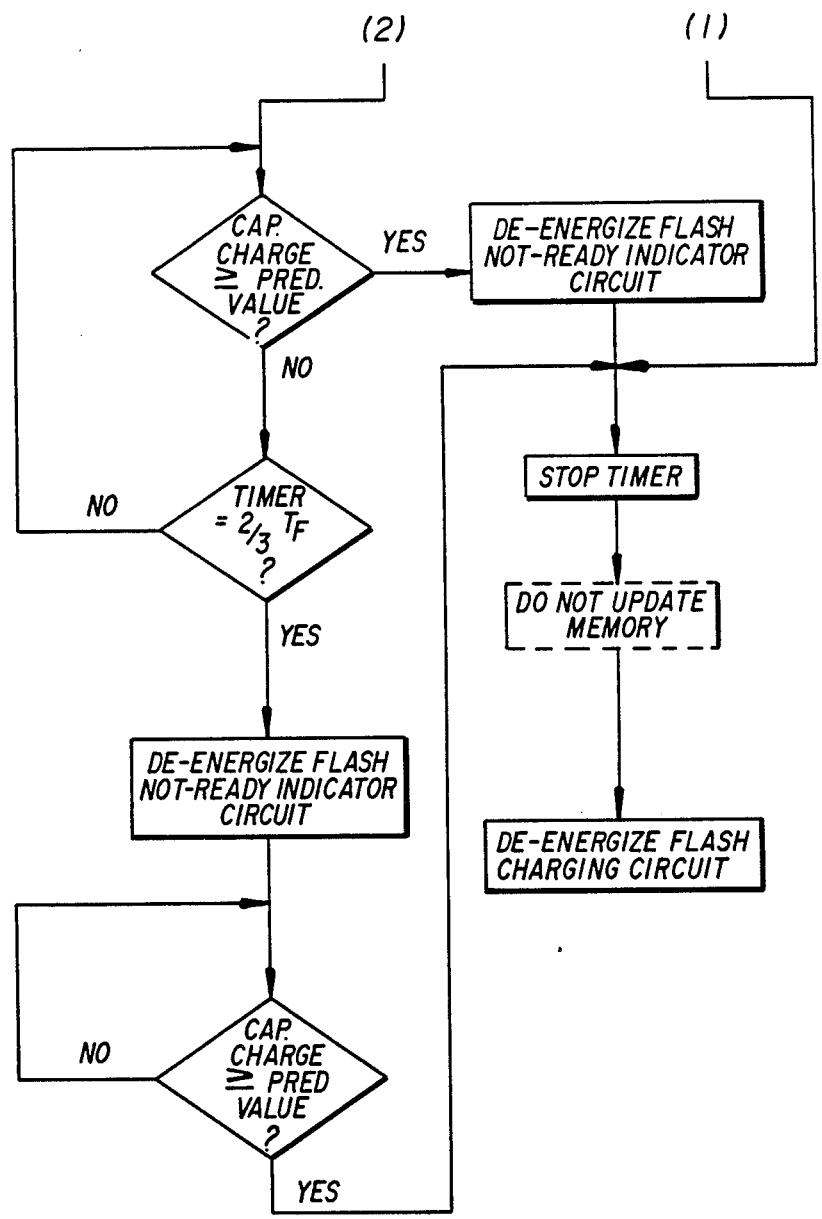

FIGS. 3A and 3B are a flow chart of the microcomputer 13 depicting the various steps of operation of the control system 1 when the power is turned on following a period of non-use and the main capacitor 5 may or may not have some residual charge. The various steps are as follows:

1. If as shown in the flow chart of FIGS. 3A and 3B the power is turned on, the timer 23 is started at $T_O$ and the flash charging circuit 7 is energized to begin recharging the main capacitor 5 (as in Step 1 for the flow chart of FIGS. 2A and 2B).

2. When the voltage level of the main capacitor 5 is less than the predetermined value corresponding to a substantially fully charged condition, the charge time actually measured by the timer 23 is less than ⅔ of the last-measured full charge time $T_F$ stored in the non-volatile memory 25, the switch SW. 1 is closed, and the level of ambient light determined by the light level detecting circuit 29 is too low for a proper daylight exposure, i.e., is less than or equal to the predetermined light level, the flash not-ready indicator circuit 27 is energized.

3. If the voltage level of the main capacitor 5 then reaches the predetermined value corresponding to a substantially fully charged condition before the charge time actually measured by the timer equals ⅔ of the last-measured full charge time $T_F$ stored in the non-volatile memory 25 (because of some residual charge in the main capacitor at the beginning of the cycle), the flash not-ready indicator circuit 27 is de-energized, the timer 23 is stopped, and the flash charging circuit 7 is de-energized. The last-measured full charge time $T_F$ stored in the non-volatile memory 25 remains the same.

4. Going back to Step 3, when the charge time actually measured by the timer 23 reaches ⅔ of the last-measured full charge time $T_F$ stored in the non-volatile memory 25 before the voltage level of the main capacitor 5 reaches the predetermined value corresponding to a substantially fully charged condition, the flash not-ready indicator circuit 27 is de-energized.

5. Then, when the voltage level of the main capacitor 5 reaches the predetermined value corresponding to a substantially fully charged condition, the timer 23 is stopped and the flash charging circuit 7 is de-energized. The last-measured full charge time $T_F$ stored in the non-volatile memory 25 remains the same.

6. Going back to Step 2, when the voltage level of the main capacitor 5 reaches the predetermined value corresponding to a substantially fully charged condition before the charge time actually measured by the timer 23 is equal to or greater than ⅔ of the last-measured full charge time $T_F$ stored in the non-volatile memory (because of some residual charge in the main capacitor at the beginning of the cycle), the timer 23 is stopped and the flash charging circuit 7 is de-energized. The last-measured full charge time $T_F$ stored in the non-volatile memory 25 remains the same.

7. Again going back to Step 2, when all of the conditions in Step 2 are met except that the level of ambient light determined by the light level detecting circuit 29 is not too low for a proper daylight exposure, then when the voltage level of the main capacitor 5 reaches the predetermined value corresponding to a fully charged condition, the timer 23 is stopped and the flash charging circuit 7 is de-energized. The last-measured full charge time $T_F$ stored in the non-volatile memory 25 remains the same.

OPERATION

According to the invention, the timer 23 is adapted to measure the charging time $T_F$ necessary to fully charge the main capacitor 5 of the electronic flash device 3 from a substantially discharged condition and to measure a lesser time $T_L$ equal to a predetermined fraction of the last-measured full charge time sufficient to adequately (not fully) charge the capacitor for the next flash exposure. Preferably, the predetermined fraction results in an under-exposure of about one-half of a stop from the flash illumination that is produced when the main capacitor 5 is fully charged. The non-volatile memory 25 for storing the last-measured full charge time $T_F$ is updated only when a new full charge time $T_F'$ is measured. If the flash device 3 is fired after the lesser time $T_L$ has elapsed, but before the main capacitor 5 is fully charged, the non-volatile memory 25 is not updated. The indicator circuit 27 visibly signals whether or not the lesser time $T_L$ has elapsed. Thus, the charging time perceived by the photographer always appears shortened to the lesser time $T_L$, even though the flash device 3 is not fired until its main capacitor 5 is fully charged. Moreover, the waiting time to fire the flash device 3 can be shortened by relying on the lesser time $T_L$.

The invention has been described with reference to a preferred embodiment. However, it will be appreciated that variations and modifications can be effected within the ordinary skill in the art without departing from the scope of the invention.

We claim:

1. An improved control system for an electronic flash device for a photographic camera, wherein flash charging means charges said flash device to enable the flash device to be fired for the next flash exposure, and wherein the improvement comprises:
   timer means for measuring the charging time during which said flash device is charged, to measure the particular full charge time necessary to fully charge the flash device from a substantially discharged condition, and to measure a lesser time equal to a predetermined fraction of the last-measured full charge time sufficient to adequately charge said flash device for the next flash exposure; and
   indicator means for indicating whether or not the lesser time measured by said timer means has elapsed, whereby the charging time perceived for said flash device appears shortened to said predetermined fraction of the last-measured full charge time.

2. An improved control system for an electronic flash device for a photographic camera, wherein (a) light level detecting means detects that the ambient light level is too low for a proper daylight exposure, (b) flash charging means charges said flash device to enable the flash device to be fired for the next flash exposure, and (c) flash triggering means is energized to fire said flash device, and wherein the improvement comprises:
   timer means for measuring the charging time during which said flash device is charged, to measure the particular full charge time necessary to fully charge the flash device from a substantially discharged condition, and to measure a lesser time equal to a predetermined fraction of the last-measured full charge time sufficient to adequately charge said flash device for the next flash exposure;
   indicator means, responsive to said detecting means detecting that the ambient light level is too low for a proper daylight exposure, for indicating that the lesser time measured by said timer means has not elapsed; and
   manually operated means for energizing said triggering means to fire said flash device after at least the lesser time measured by said timer means has elapsed, whereby the waiting time to fire the flash device can be shortened by relying on said lesser time.

3. An improved control system according to claim 2, wherein the improvement further comprises:
   memory means for storing the last-measured full charge time, to enable the lesser time measured by said timer means to be determined from said last-measured full charge time regardless of whether said flash device is fired before it is fully charged; and
   control means for updating said memory means as to the last-measured full charge time.

4. An improved control system according to claim 2, wherein said predetermined fraction of the last-measured full charge time is approximately $\frac{2}{3}$.

5. An improved control system for an electronic flash device for a photographic camera, wherein (a) flash charging means charges said flash device to enable the flash device to be fired for the next flash exposure and (b) flash triggering means is energized to fire said flash device, and wherein the improvement comprises:
   timer means for measuring the charging time during which said flash device is charged, to measure the particular full charge time necessary to fully charge the flash device from a substantially discharged condition, and to measure a lesser time equal to a predetermined fraction of the last-measured full charge time sufficient to adequately charge said flash device for the next flash exposure;
   manually operated means for selectively energizing said triggering means to fire said flash device after the lesser time measured by said timer means has elapsed or after the flash device is fully charged;
   memory means for storing the last-measured full charge time, to enable the lesser time measured by said timer means to be determined from said last-measured full charge time regardless of whether said flash device is fired before it is fully charged; and
   control means for updating said memory means as to the last-measured full charge time.

6. An improved control system according to claim 5, wherein said control means determines that said flash device is fully charged from a substantially discharged condition and, in response thereto, updates said memory means as to the particular full charge time measured during the charging of the flash device.

* * * * *